(No Model.)
E. P. USHER.
BATTERY CELL.
No. 480,884. Patented Aug. 16, 1892.
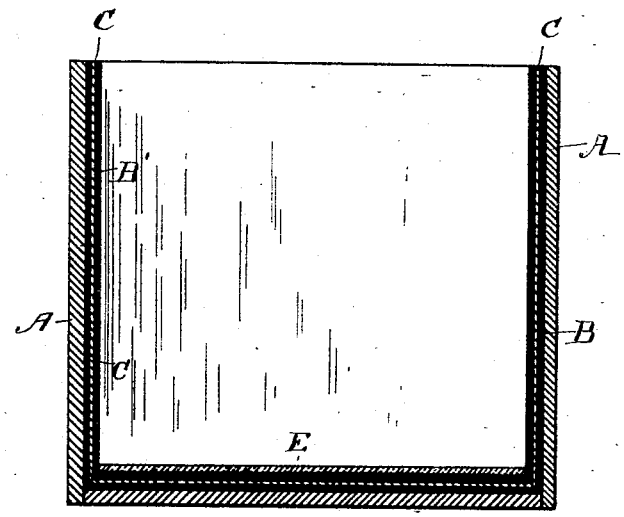
WITNESSES.
Frank G. Parker
Matthew M. Blunt
INVENTOR.
Edward P. Usher
by N. N. Prewett
Attorney

UNITED STATES PATENT OFFICE.

EDWARD P. USHER, OF GRAFTON, MASSACHUSETTS, ASSIGNOR TO THE HOPEDALE ELECTRIC COMPANY, OF WEST VIRGINIA.

BATTERY-CELL.

SPECIFICATION forming part of Letters Patent No. 480,884, dated August 16, 1892.

Application filed February 19, 1892. Serial No. 422,093. (No model.)

*To all whom it may concern:*

Be it known that I, EDWARD P. USHER, of Grafton, in the county of Worcester and State of Massachusetts, have invented certain new and useful Improvements in Battery-Cells, of which the following, taken in connection with the accompanying drawings, is a specification.

My invention especially relates to the receptacle or cell for holding the element of a secondary battery, while it is also of great service in making, for a low price, jars or tanks for holding acids. It has been customary to use for this purpose jars made of glass or rubber. The glass is objectionable because of the liability to break, while the rubber is expensive and unless made very thick is apt to bulge or crack, and it often does this to the point of bursting open. The receptacle which I have devised is very cheap and seems, in practice, to be open to no objections.

In the drawing my improved receptacle is represented empty and in vertical section.

I make the outer box A of my cell of the proper size of wood, papier-maché, pasteboard, or any similar substances. I form independently a thin shell C, adapted in its proportions to easily fit into this wooden cell. This shell may be made of thin lead, thin vulcalized rubber, which may be soft or hard, or of any other suitable substance. For battery use I have taken thin lead, although any other substance may be employed which is not readily acted upon by the acid to be held in the cell. I then prepare a gum which may be made in various ways, the object being to have it flow readily when very hot, to have it form a coating, cool rapidly and become hard, to have it insoluble in the acid, and above all to have it adhere tenaciously to any substance to which it is applied when hot.

Having my wooden cell, my lead shell, or their equivalents, and my hot liquid gum, I fill up the wooden cell with the liquid and immediately pour it out again, leaving all the sides covered with a coating B of the sticky substance. Into this I at once insert the lead shell C, which adheres to the surrounding coated walls of the cell; and I then pour the shell full of the liquid and at once pour this out again, leaving within it a like coating B', and when it has had time to harden the parts are firmly united, my receptacle is completed and in an hour is ready for use.

I have compounded a peculiar gum, which answers the purpose well, by combining two parts each of beeswax, pitch, and rosin with one part each of sulphur and tallow, all thoroughly mixed and commingled, and applied, as stated, while very hot. The proportions may be somewhat varied. I make no present claim to this compound, the same forming the subject-matter of my application for patent, filed June 10, 1892, Serial No. 436,211.

It is also desirable to lay in the bottom of the receptacle when completed a sheet of thin rubber of the proper size, to fit within the walls for the lower edges of the plates to rest on.

A cell constructed as described affords great security since the gum-lined outer box or cell is reinforced by the inner shell, which, incased as it is on both sides with the protective gum, seems an absolute safeguard against leakage.

I claim as my invention—

The improved cell or acid-jar described, consisting of an outer wall or receptacle A, a lining of acid-proof gum B applied thereto, and a thin shell C, embedded in said gum lining and coated externally and internally therewith, the parts being permanently united by the hardening of the gum, substantially as set forth.

In testimony whereof I have signed my name to this specification, in the presence of two subscribing witnesses, on this 17th day of February, A. D. 1892.

EDWARD P. USHER.

Witnesses:
  A. H. SPENCER,
  GEORGE S. LITTLEFIELD.